July 29, 1958

C. E. HUFFMAN 2,845,618

TELEVISION VIEWING DEVICE

Filed Jan. 11, 1954

INVENTOR.
CHARLES E. HUFFMAN
BY Darby & Darby
ATTORNEYS

United States Patent Office 2,845,618

Patented July 29, 1958

2,845,618

TELEVISION VIEWING DEVICE

Charles E. Huffman, Upper Montclair, N. J., assignor to Allen B. Du Mont Laboratories, Inc., Clifton, N. J., a corporation of Delaware Application January 11, 1954, Serial No. 403,284

1 Claim. (Cl. 340—369)

This invention relates to viewing devices for the presentation of stereoscopic television images and the like.

It is a principal object of the invention to provide improved means for the presentation of two television images on a common area.

Other objects are to provide an improved stereoscopic television viewing device using light polarizing filters and analyzers to separate the views of the left and right eyes or to separate images appearing on a common plane.

Further objects will be apparent after studying the following specification, together with the drawings in which Figure 1 shows diagrammatically a scene to be televised and simplified stereoscopic television pickup and transmitting apparatus;

The viewing device of the invention makes use of a semi-reflective, semi-transparent, or interference, semi-transparent, type of mirror to integrate images from two cathode ray tubes onto a common area and polarizing filters and analyzers to separate the images of the two tubes from each other within the common area. It has been found that there is a particular relation which must be observed between the orientation of the various polarizing filters and analyzers used in such a viewing device.

Figures 1, 2, 3:
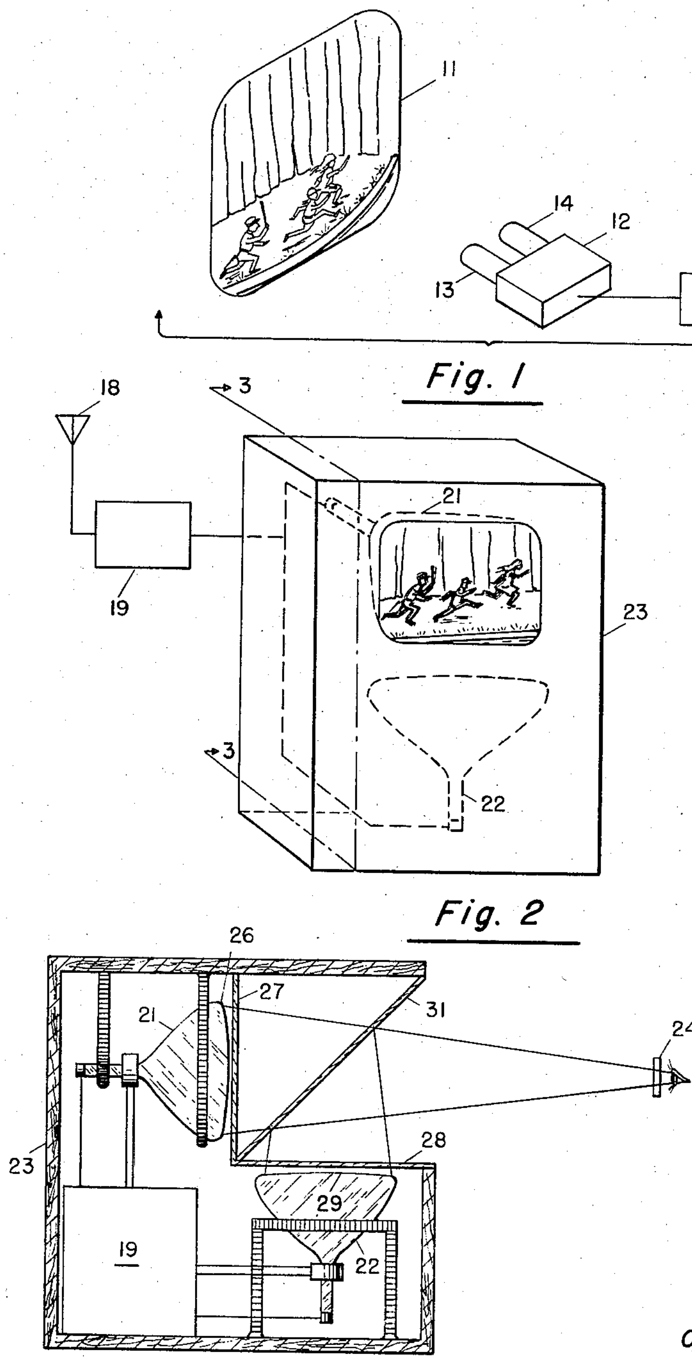
Figure 2 is a perspective view of apparatus for receiving the signal transmitted by the apparatus of Figure 1.
Figure 3 is a sectional view of the apparatus in Figure 2 taken on the line 3—3 therein.

Figure 1 shows a scene 11 to be televised. Light from the scene 11 is transformed into two television images by a camera 12, one of the images being that corresponding to light passing through the left lens 13 and the other of the images being that corresponding to light pasing through the right lens 14. Within the camera apparatus 12, the two images may be combined in any known way to form a composite stereoscopic television image. One of such ways, a sequential presentation of first one image and then the other, alternating at any convenient predetermined rate, is disclosed in an application by Jesse H. Haines, Serial No. 230,930, and now abandoned, but other systems for diplexing the two signals are well-known in the art. The combined or diplexed signals are amplified and made ready for transmisison in transmitting apparatus 16 which generates a radio frequency signal emitted by an antenna 17.

The signal from antenna 17 is picked up by a receiving antenna 18 in Figure 2 and applied to suitable receiving apparatus 19 of any well-known type, which applies the signals so received to modulate the electron beams in cathode ray tubes 21 and 22 in a viewing device 23. The images formed on tubes 21 and 22 are observed by a viewer looking through a sheet 24 of polarizing material, which may be termed an analyzer.

The interior of the viewing device 23 of Figure 2 is presented in Figure 3 in which the cathode ray tube 21 is shown mounted with its axis horizontal and the cathode ray tube 22 is shown mounted with its axis vertical. The tube may be in any desired position so long as the viewing screens thereof lie in planes substantially normal to each other. Directly in front of the fluorescent screen 26 of tube 21 is a sheet of polarizing material 27, and a similar sheet 28 is located directly in front of the fluorescent screen 29 of tube 22. A semi-transparent mirror 31 is located at an angle of substantially 45° to the horizontal in position to bisect the 90° angle between the planes of polarizing sheets 27 and 28. The position of the polarizing device 24 relative to the set and an observer is shown.

Figure 6:
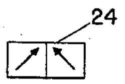
Figure 6 shows viewing apparatus for use with the apparatus of Figures 1 and 2.

It will be noted that there are two arrows on the analyzer 24 of Figure 6. These arrows represent the planes of polarization of the two sides or elements of the analyzer and are 90° to each other and at 45° with respect to the horizontal axis of the image in the viewing device 23. One advantage of this particular arrangement of the planes of polarization is that the analyzer 24 may be made quite inexpensively and is symmetrical about a center line so that it may be reversed without causing confusion to the viewer.

It is well-known that in a viewing device such as the one represented by reference character 23, light from one source of images (fluorescent screen 26) must reach the analyzer 24, polarized at an angle of 90° with respect to light emitting from the other image source (screen 29) in order for the two sections of the analyzer 24 to separate the two images completely. Thus one of the viewer will receive only light from the screen 26 through one side of the analyzer 24 and the other eye of the viewer will receive only light from the screen 29 through the other side of the analyzer 24. However, it has been found that a certain rotation of the plane of polarization takes place as the polarized light from screen 26 passes through the semi-transparent mirror 31, and another rotation of the plane of polarization takes place as the polarized light from screen 29 is reflected from the semi-transparent mirror 31. The amounts of these angles of rotation are not necessarily the same; it has been found in practice that polarized light from screen 26 is rotated by an angle of approximately 6° for a semi-transparent mirror 31, while polarized light from screen 29 is rotated by an angle of 17°.

Figure 4:
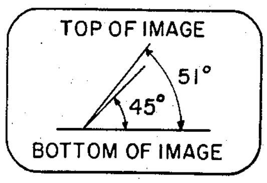
Figures 4 and 5 are plan views of the screen of the apparatus presenting the images in the viewing device of Figure 3, depicting certain angular relations of the polarizing media used therewith.
Figure 5:
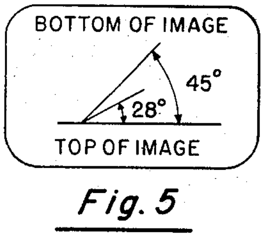

Consequently, in order to be able to use a symmetrical, or reversible, analyzer 24 in which the planes of polarization of the two halves are at plus and minus 45° respectively, compared to a vertical axis, it is necessary that the polarizers 27 and 28 be rotated so that the plane of polarization of light transmitted through these filters is offset to compensate for the further rotation due to semi-transparent mirror 31. The angle by which the polarizing filter 27 is offset is illustrated in Figure 4, which shows that instead of being oriented so that the plane of polarization of the light is at the main 45° angle with respect to a predetermined horizontal line the filter must be offset so that the actual angle of polarization of polarizer 27 is 51°, with respect to the horizontal line. The polarizer 28, on the other hand, is shown in Figure 5 offset by 17° from the main 45° angle so that the plane of polarization makes an angle of 28° with respect to a horizontal line. It is apparent that the amount of rotation of the polarization caused by the semi-transparent mirror 31 is not a function of the original angle of polarization of the polarized filters 27 and 28. Therefore, once the mutually perpendicular planes of polarization of analyzer 24 are chosen, as for instance if the planes are vertical and horizontal, the plane of polarization of polarizers 27 and 28 must be chosen accordingly (vertical and horizontal in the example given) and then offset 6° and 17°, respectively, from these chosen angles, just as is done for the 45° orientation example in Figures 4 and 5. The offset angles are dependent on the material from which the semi-transparent mirror 31 is made, and the example given of 6° and 17° is not to be considered as a limitation on the invention.

In the example given above the interference mirror was made of the type glass identified as "Water-White Glass," as manufactured by the Pittsburg Plate Glass Company, although any glass suitable for such a mirror could be used, and the polarizers 27 and 28 were made of Polaroid HN–32 Linear Polarization film, as manufactured by the Polaroid Company.

What is claimed is:

The combination comprising means to produce two separate television type presentations; means to polarize the light from each said presentation; means for presenting said separate presentations on a common viewing area, said area being a semi-transparent mirror having the characteristic of rotating the plane of polarization of the light from said presentations; a viewing device consisting of symmetrically positioned analyzers having their planes of polarization at an angle of 90°; and means to compensate for the rotation introduced by said viewing area, said means comprising said polarizing means, each said polarizing means being positioned between said viewing area and a respective presentation at an angle equal to but opposite the rotational angle introduced by the viewing area for that presentation, whereby the light eventually emitted from said viewing area is polarized in planes corresponding to those of said analyzers.

References Cited in the file of this patent

UNITED STATES PATENTS

| | | |
|---|---|---|
| 2,514,828 | Ayres | July 11, 1950 |
| 2,665,335 | Cahen | Jan. 5, 1954 |

OTHER REFERENCES

Physical Optics, by R. W. Wood, published by The Macmillan Co., 1929, pages 288–289; 293–295.